July 25, 1944.　　J. M. WALTER　　2,354,414
HORIZONTAL MILLING, DRILLING, AND BORING MACHINE OF THE FLOOR TYPE
Filed May 11, 1942
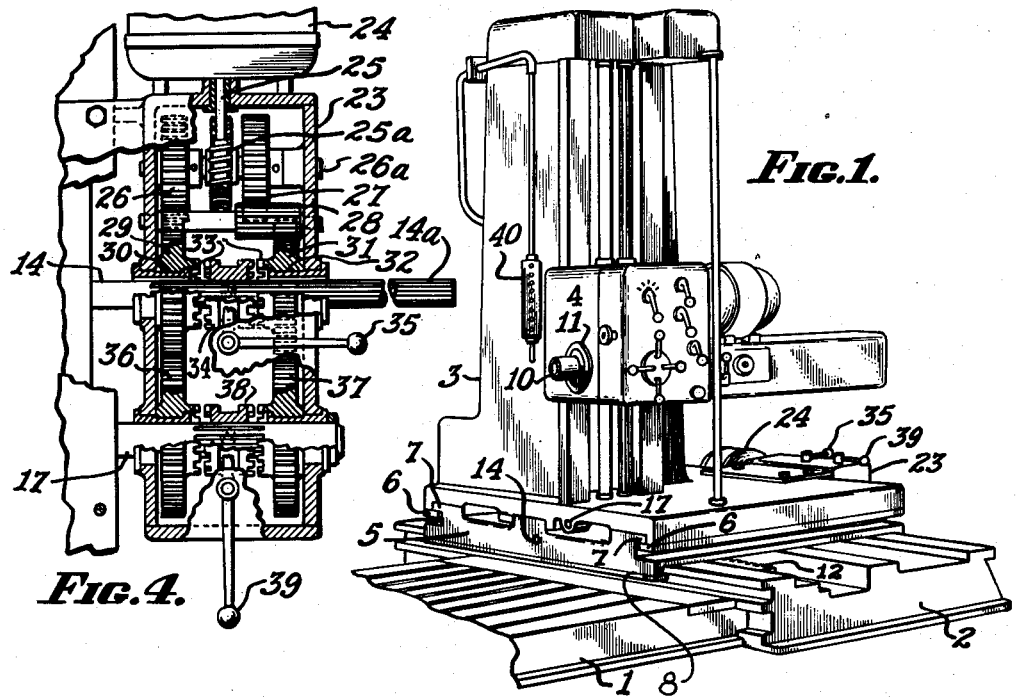
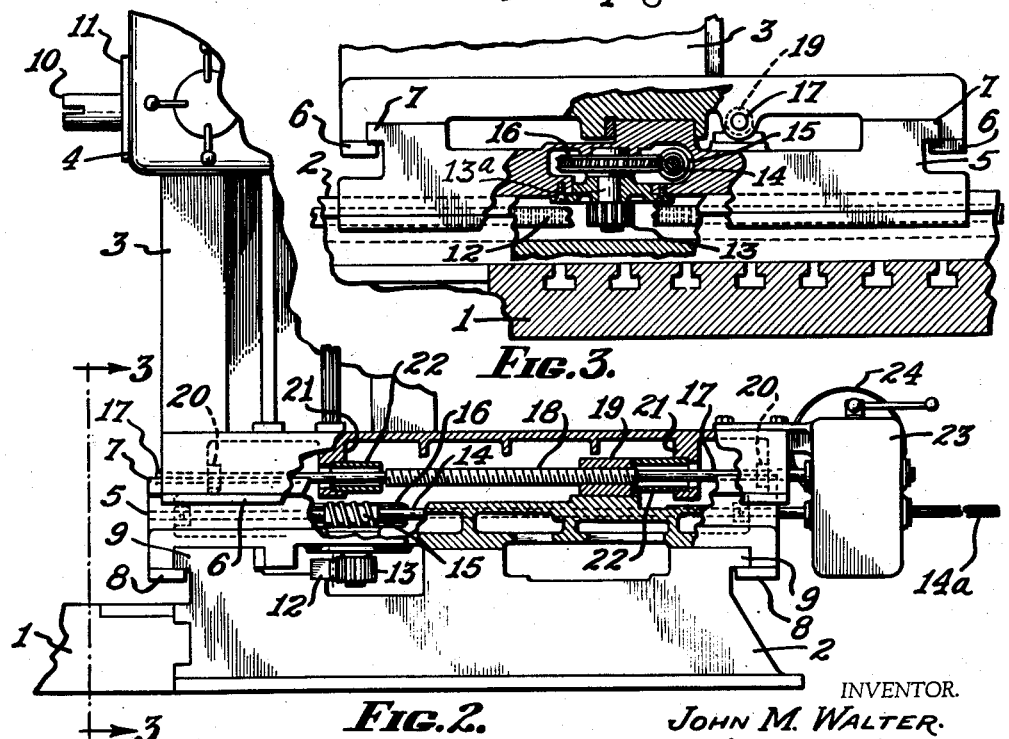
INVENTOR.
JOHN M. WALTER.
BY Allen & Allen
ATTORNEYS.

Patented July 25, 1944

2,354,414

UNITED STATES PATENT OFFICE 2,354,414

HORIZONTAL MILLING, DRILLING, AND BORING MACHINE OF THE FLOOR TYPE

John M. Walter, Cincinnati, Ohio, assignor to The G. A. Gray Company, Cincinnati, Ohio, a corporation of Ohio Application May 11, 1942, Serial No. 442,468

5 Claims. (Cl. 29—26)

In machines of the above noted type, the several operations require mechanical set ups for best operation which are to a degree inconsistent with each other. Thus when such a machine is used for drilling or boring operations, great steadiness of the tool holder support is not required, whereas in a milling operation it is necessary that very great steadiness be provided. The steadiness for milling operations requires that the work be close to the bearings for the tool holder, whereas drilling tools and boring tools will often have long shanks or stems to permit of passage into or through the work, wherefore the tool itself will not be close to the main bearings for the tool holder.

In such machines there is normally a bed on which the work is held, although in certain models the factory floor serves as a bed and the huge machines are moved by crane to position adjacent the work. Essential to the construction is a base over which the large columnar housing travels at the side of the work. There has been as yet no way evolved for providing the best working conditions for both milling and boring the same piece of work without relocating it which is simple and free of difficulty. Thus it has been proposed to provide for large sliding bearing for the tool shaft in such machines, which bearing would be moved outwardly when milling cutters were used, thus bringing the tool support close to the working point. When drilling or boring, this bearing or sleeve was withdrawn.

It is the object of my invention to provide in a machine of the type in question a side housing which carries the several motors, heads, feeds and the like which not only moves along the bed of the machine, but which moves transversely to the bed. In this way the entire housing can be moved up to the work or away from it, and in addition can be moved to advantageous position for any series of operations and shifted readily to and fro to permit use of drilling and boring tools, or milling cutters, in each instance providing proper support and tool length, but without disturbing the position of the work.

More particularly, in the example shown, the side housing is carried on a base which is fed to and fro along the machine bed, and is furthermore movable crosswise of this base by means of a drive which is conveniently correlated with the drive which moves the entire housing.

In the drawing Figure 1 is a perspective of one side of a machine characterized as a combined drilling, boring, and milling machine, of conventional type, except for the improvements to be noted.

Figure 2 is an enlarged front elevation with parts broken away and other parts in section, showing certain drive members of the two feeds.

Figure 3 is a section taken along the line 3—3 of Figure 2, but having parts broken away and other parts in section, and Figure 4 is a plan view with parts profusely broken away and in section, showing the gear box for forward and reverse drive of the two feeds.

In the illustrated example of my invention, the work carrying bed of the machine is indicated at 1, and the base having ways thereon on which the side housing moves is shown at 2. The housing is shown at 3, being a large columnar support that mounts the various drives, feeds and the like, and slidably mounted for vertical movement thereon is the tool drive head 4.

The housing 3 is supported on a base 5, which base or saddle serves as a slide for the housing, in a direction transverse the ways. As shown in Figures 1 and 3, the housing has plates 6 at its margins which underlie ribs 7 extending crosswise of the base 5, thus retaining the housing firmly but slidably on the base or saddle.

The base member 5 is slidable on the ways 2 and as seen in Figures 1 and 2, has gripping plates 8, corresponding to the plates 6 of the main column, engaging beneath ribs 9 on the ways 2.

The head 4 supports the spindle, which carries the tool holder 10 in conventional bearings, one of which is indicated at 11. The base 2 has along one rail thereof, a rack 12, which is engaged by a pinion 13 carried in the member 5. The rotation of pinion 13 thus feeds or drives the member 5, and therefore the housing 3 carried thereon, in the conventional path along the rails or ways of the base 2 as required for performing the particular work involved.

To drive pinion 13 there is a shaft 14 suitably mounted in bearings on the member 5, and having a worm 15 thereon which engages a worm wheel 16 located on the upper end of the shaft 13a of the pinion 13. The shaft 14 extends laterally from the member 5 and is splined at its projecting end 14a for reasons to be noted below.

To drive the housing 3 with respect to the member 5, there is a shaft 17 suitably supported in the lower part of the housing, which shaft has a threaded portion 18 thereon. The threaded portion passes through a nut 19, fixed to member 5. Thus as the shaft 17 is revolved the housing 3 will be moved with respect to member 5. Thrust collars 20 are supplied for the shaft 17, and it too extends laterally from the housing member.

Within the lower portion of the housing member are supported on suitable brackets 21, a pair of stop sleeves 22, shown in section in Figure 2. These limit the to and fro movement of the housing on the member 5.

The motor and drive means for the two shafts 14 and 17 are mounted on the housing member proper rather than the base portion. The case or gear box of the drive is indicated at 23, and the motor at 24. Referring to Figure 4, the motor shaft 25 is equipped with a suitable worm drive 25a which actuates two like gears 26 and 27, mounted on a shaft 26a, the latter gear being meshed with a reverse pinion 28. Gear 26 engages a gear 29 which is rotatably supported in the drive case by suitable means such as a sleeve 30, so that it is loose with respect to the shaft 14. The reverse pinion 28 engages a companion gear 31 of the gear 29, similarly supported on a sleeve 32 so that it is also loose with respect to the shaft 14. Between the two pinions each of which have clutch teeth 33 on their exposed opposed faces, is a clutch collar 34, which is splined to the shaft 14 and can be moved to engage either of the pinion clutch faces to drive the shaft in the required direction. A handle 35 is illustrated as mounted on the drive box for that purpose.

The gears 36 and 37 for driving shaft 17 are loosely mounted thereover by means of sleeves, in the same manner as the gears 29 and 31, and a clutch member 38 serves to connect the desired gear to the splined outer end of the said shaft 17, as in the case of the drive for shaft 14. The clutch operating handle 39 serves the clutch 38. The gears 36 and 37 mesh with and are driven by pinions 29 and 31.

It will now be clear, that when it is desired to move the housing 3 with respect to the ways 2 in the conventional manner, the clutch 34 will be brought into meshing position in the desired direction, whereupon when the motor drive is energized, as by depression of a push button carried in the pendent switch 40, the member 5 will be caused to move along the ways 2 carrying with it the housing 3 and the tool head 4. When it is desired to move the housing transversely, the clutch 38 is operated in the desired direction which will result in movement of the housing member when the drive motor is energized.

Now, if after performing a milling operation on a piece of work, with a suitable milling tool mounted in the tool holder, it is desired to mount a drill for performing a drilling operation, the housing will simply be moved back to permit of easy mounting of this drill. The housing can then be moved inwardly so as to bring the same to any convenient position. If it is desired to move the entire tool carrying structure along the ways, this will be done without necessarily affecting the transverse position of the housing on the base, or, if it is necessary in order to clear a portion of the work to shift the structure along, the housing can be temporarily moved outwardly for that purpose.

The mechanism as shown is compact and simple, being operated from a single point with but one motor, which is essential in any event to move the housing structure along the ways. The mechanism also provides for a new movement in combination boring, drilling and milling machines of the indicated type, which mechanism is inexpensive and highly convenient in various machining operations.

Having thus described my invention, what I claim as new and desire to secure by Letters Patent is:

1. A horizontal milling, drilling and boring machine of the floor type comprising a vertical housing, a head movable vertically on the said housing, a tool spindle within said head, power means on said head for driving the spindle, the housing having a base unitary therewith, a sub-base beneath the first base, ways on the sub-base for guiding the housing base on the sub-base for movement transversely, and ways on the floor supporting the sub-base for guiding the sub-base for movement in a longitudinal direction, a drive for the housing base on the sub-base, and a drive for the sub-base on the floor ways, and power means for selectively energizing the said drives carried on one of the bases.

2. A horizontal milling, drilling and boring machine of the floor type comprising a vertical housing, a head movable vertically on the said housing, a tool spindle within said head, power means on said head for driving the spindle, the housing having a base unitary therewith, a sub-base beneath the first base, ways on the sub-base for guiding the housing base on the sub-base for movement transversely, and ways on the floor supporting the sub-base for guiding the sub-base for movement in a longitudinal direction, a drive for the housing base on the sub-base, and a drive for the sub-base on the floor ways, and power means for selectively energizing the said drives carried on the housing base.

3. A horizontal milling, drilling and boring machine of the floor type comprising a vertical housing, a head movable vertically on the said housing, a tool spindle within said head, power means on said head for driving the spindle, the housing having a base unitary therewith, a sub-base beneath the first base, ways on the sub-base for guiding the housing base on the sub-base for movement transversely, and ways on the floor supporting the sub-base for guiding the sub-base for movement in a longitudinal direction, a drive for the housing base on the sub-base, and a drive for the sub-base on the floor ways, and power means for selectively energizing the said drives carried on the housing base, the drive for the sub-base on the floor ways comprising a splined shaft engaging the power means and a gear driven thereby engaging a rack on the floor ways.

4. A horizontal milling, drilling and boring machine of the floor type comprising a vertical housing, a head movable vertically on the said housing, a tool spindle within said head, power means on said head for driving the spindle, the housing having a base unitary therewith, a sub-base beneath the first base, ways on the sub-base for guiding the housing base on the sub-base for movement transversely, and ways on the floor supporting the sub-base for guiding the sub-base for movement in a longitudinal direction, a drive for the housing base on the sub-base, and a drive for the sub-base on the floor ways, and power means for selectively energizing the said drives carried on the housing base, the drive for the housing base on the sub-base comprising a worm shaft on the housing base engaging a nut mounted on the sub-base.

5. A horizontal milling, drilling and boring machine of the floor type comprising a vertical housing, a head movable vertically on the said housing, a tool spindle within said head, power means on said head for driving the spindle, the housing having a base unitary therewith, a sub-base beneath the first base, ways on the sub-base for guiding the housing base on the sub-base for movement transversely, and ways on the floor supporting the sub-base for guiding the sub-base for movement in a longitudinal direction, a drive for the housing base on the sub-base, and a drive for the sub-base on the floor ways, and power means for selectively energizing the said drives carried on the housing base, the drive for the sub-base on the floor ways comprising a splined shaft engaging the power means and a gear driven thereby engaging a rack on the floor ways, the drive for the housing base on the sub-base comprising a worm shaft on the housing base engaging a nut mounted on the sub-base.

JOHN M. WALTER.